United States Patent
Rodkey et al.

(10) Patent No.: US 7,418,085 B2
(45) Date of Patent: *Aug. 26, 2008

(54) SPECIAL NEEDS DIGITAL NOTIFICATION AND RESPONSE SYSTEM

(75) Inventors: Ryan Scott Rodkey, Sugar Land, TX (US); John Frank Rodkey, Jr., Missouri City, TX (US); David Lynn Hickey, Rosharon, TX (US); Ronald F. Ramsey, St. Petersburg, FL (US); Darren Lynn Ross, Sugar Land, TX (US)

(73) Assignee: Techradium, Inc., Sugar Land, TX (US)

( * ) Notice: Subject to any disclaimer, the term of this patent is extended or adjusted under 35 U.S.C. 154(b) by 213 days.

This patent is subject to a terminal disclaimer.

(21) Appl. No.: 11/522,731

(22) Filed: Sep. 18, 2006

(65) Prior Publication Data

US 2007/0041514 A1    Feb. 22, 2007

Related U.S. Application Data

(63) Continuation-in-part of application No. 11/117,594, filed on Apr. 28, 2005, now Pat. No. 7,130,389.

(51) Int. Cl.
*H04M 1/64* (2006.01)
(52) U.S. Cl. .................. 379/88.12; 379/88.23; 379/252; 455/414.1
(58) Field of Classification Search ............... 370/465; 379/37, 88.12, 88.23, 252; 704/235; 705/52; 709/204; 455/414.1
See application file for complete search history.

(56) References Cited

U.S. PATENT DOCUMENTS

| | | | |
|---|---|---|---|
| 6,442,241 | B1 | 8/2002 | Tsumpes |
| 6,463,462 | B1 | 10/2002 | Smith |
| 6,496,568 | B1 | 12/2002 | Nelson |
| 6,643,355 | B1 | 11/2003 | Tsumpes |
| 6,697,477 | B2 | 2/2004 | Fleischer |
| 6,816,878 | B1 | 11/2004 | Zimmers et al. |
| 6,871,214 | B2 | 3/2005 | Parsons |
| 6,912,691 | B1 | 6/2005 | Dodrill et al. |
| 6,931,415 | B2 | 8/2005 | Nagahara |
| 6,973,166 | B1 | 12/2005 | Tsumpes |
| 2002/0032020 | A1 | 3/2002 | Brown |
| 2005/0013417 | A1 | 1/2005 | Zimmers et al. |

*Primary Examiner*—Gerald Gauthier
(74) *Attorney, Agent, or Firm*—Buskop Law Group, PC; Wendy Buskop (57) ABSTRACT

A digital notification and response system utilizes an administrator interface to transmit a message from an administrator to a special needs contact device and responders contact devices. The system comprises a dynamic information database that includes member contact data, priority information, response data, and grouping information. The administrator initiates distribution of the message based upon grouping information, priority information, and the priority order. The message is transmitted through at least two industry standard protocols simultaneously to groups of contact devices based upon priority information. Once the message is received by the contact device, the contact device transmits a response through the industry standard protocol back to the dynamic information database.

27 Claims, 5 Drawing Sheets

SPECIAL NEEDS DIGITAL NOTIFICATION AND RESPONSE SYSTEM

This patent application claims the benefit, under 35 USC §120, of the prior non-provisional application Ser. No. 11/117,594, which was filed Apr. 28, 2005.

FIELD

The present embodiments relate generally to the creation and delivery of messages for special needs people, including the handicapped and elderly, which includes routing, verifying, and collecting responses to the messages. The system and methods are universally applicable to, and independent of, the type of messaging system and device selected by the message recipients or guardians of the special needs message recipients.

More particularly, the present embodiments relate to an immediate response information or emergency system specially designed for special needs people.

BACKGROUND

Special needs people have difficulty in receiving information concerning emergency messages. Special needs people, may need special oxygen, wheelchairs, or other special equipment, when they have to be moved, due to emergencies. The special needs information needs to be communicated to shelters and emergency personnel so that special needs people are transferred to shelters with the correct equipment needed to accommodate their special needs.

A need exists for a system and method for automating and delivering messages to members of a special needs network, which include messages to facility managers, individuals, vendors and others, so that evacuations can occur easily, and special needs people can be taken directly to facilities that can provide them with the equipment, oxygen and other necessary instruments to survive in the face of a major hurricane or other natural disaster.

A need exists for a digital information and response system to bridge the gap between the government and the public for communicating with special needs people, facilities, support services, and first responders without being limited to one communication device or one message.

A need exists for a method of communication from an administrator which reaches all possible forms of communication devices, so that all members of the special needs network can be reached in multiple languages.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to an immediate response information or emergency system for special needs persons in situations where they are required to be transported to a new location or facility.

The present embodiments relate to the creating and delivering messages, to routing messages, and to the verifying and collecting responses to the messages for persons in the special needs network.

The system and methods are universally applicable to, and independent of, the type of messaging system and device selected by the message recipients.

The present embodiment relates to the simultaneous transmission of a message in multiple languages to a user device by simultaneously transmitting through two at least two industry standard protocols, wherein the recipient of the message selects the language for transmission to the recipient.

The embodied immediate response information systems provide a timely and uniform manner to contact numerous users through numerous member contact devices, such as a cell phone, a television, a light emitting diode or "LED" display, a land phone line, an e-mail address, a fax machine, a pager, a digital display, a similar device, and a handheld wireless device, including personal digital assistants or "PDAs" and Blackberries™.

The system is used to contact special needs people, and vendors and providers for special needs people in the case of emergency conditions, such as storms or fire, and in the case of informational situations, such as thunderstorm warnings, flash flood warnings, tornado warnings, and so forth. Additionally, terrorist threat levels can be transmitted using this system. The system can be used to advise hospice workers, hospital workers, and nursing home workers about building condition updates, such as the reasons why fire trucks pulled up to the facility, or other critical conditions.

The system can also be used to update members on the network of the special needs people on a "real time" basis to participants with contact devices.

The present embodiments provide a system that has a high speed notification and response system in which information is accessed and stored in a dynamic information database, and conveyed to users with member contact devices in a specific priority order. The systems can be set to contact users automatically when specific conditions arise, or to contact users when initiated by an administrator. The systems can be set to contact a large number of users in a systematic manner and to obtain and collect multiple responses.

The present embodiments can be used to save lives because the system can notify large groups of individuals concerning very dangerous situations quickly and can be transmitted to many different contact devices. The system can be used to stop rumors that a situation is safe. This system stops panic and chaos, because the system can send a consistent message to all users on the system.

The system can not only provide information but can collect responses so that administrators can send help to special needs people that are trapped in their homes or suffering without power, or need immediate attention.

Figure 1:
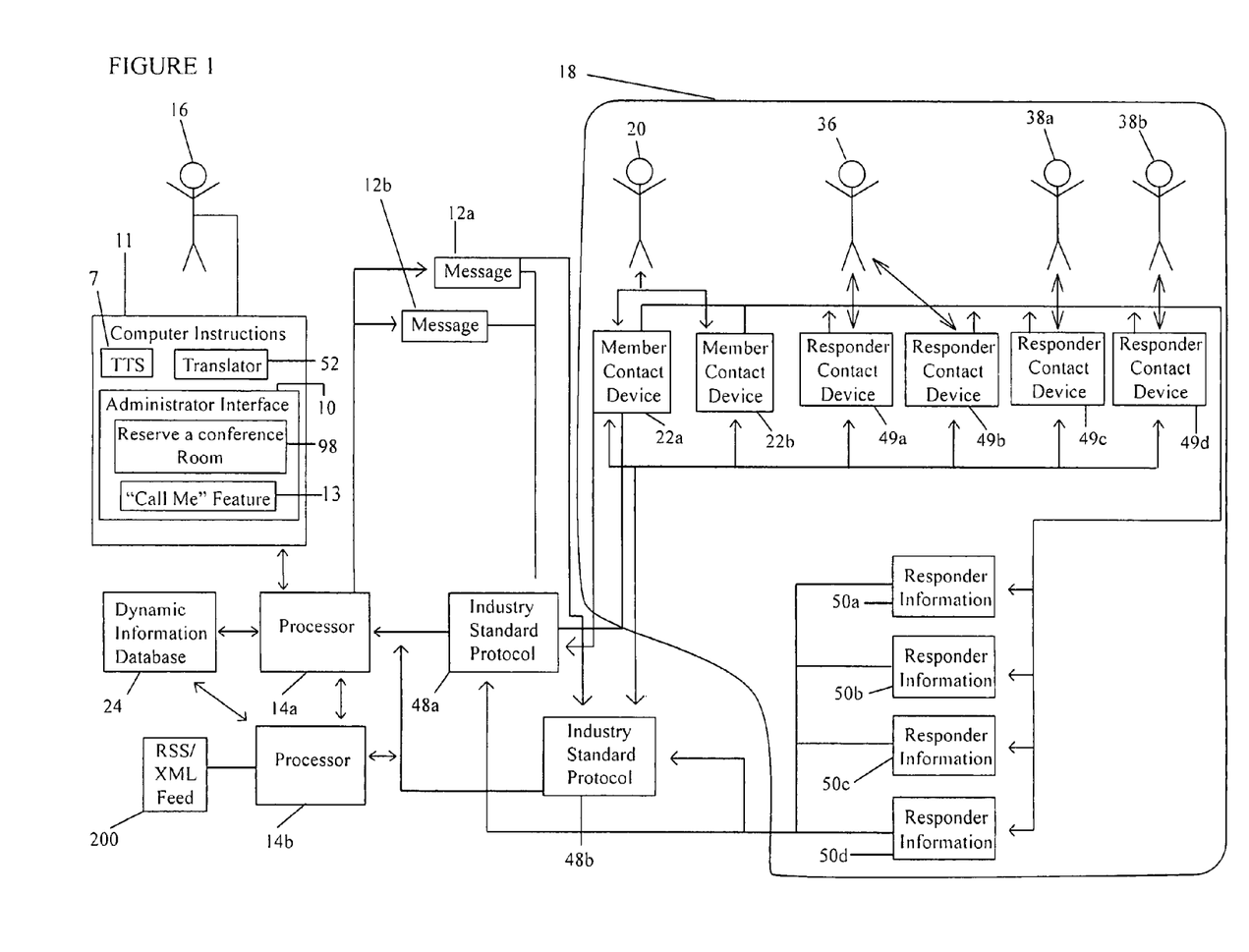
FIG. 1 depicts a representation of an embodiment of a digital notification and response system for handling special needs people.

With reference to the figures, FIG. 1 shows an embodiment of a digital notification and response system having a plurality of special needs member contact devices 22a and 22b, which can be handheld wireless devices, wireless phones, land phones, e-mail addresses, digital displays, and light emitting diode ("LED") displays, fax machines, pagers, and similar devices that are capable of receiving a message. An example of a handheld device includes a personal digital assistant ("PDA"), a Blackberry™, or a cellular phone.

An administrator interface 10, is used for preparing and transmitting a message 12a and 12b from an administrator 16 using at least one processor 14a, which in the embodiment of FIG. 1 shows two processors, 14a and 14b in a special needs network 18.

Each special needs member 20 of the special needs network 18 can have at least one user contact device 22a and 22b. Additional contact devices can be used.

The processors 14a and 14b communicates with a dynamic information database 24 for use in preparing the message 12a or 12b or both.

Figure 2:
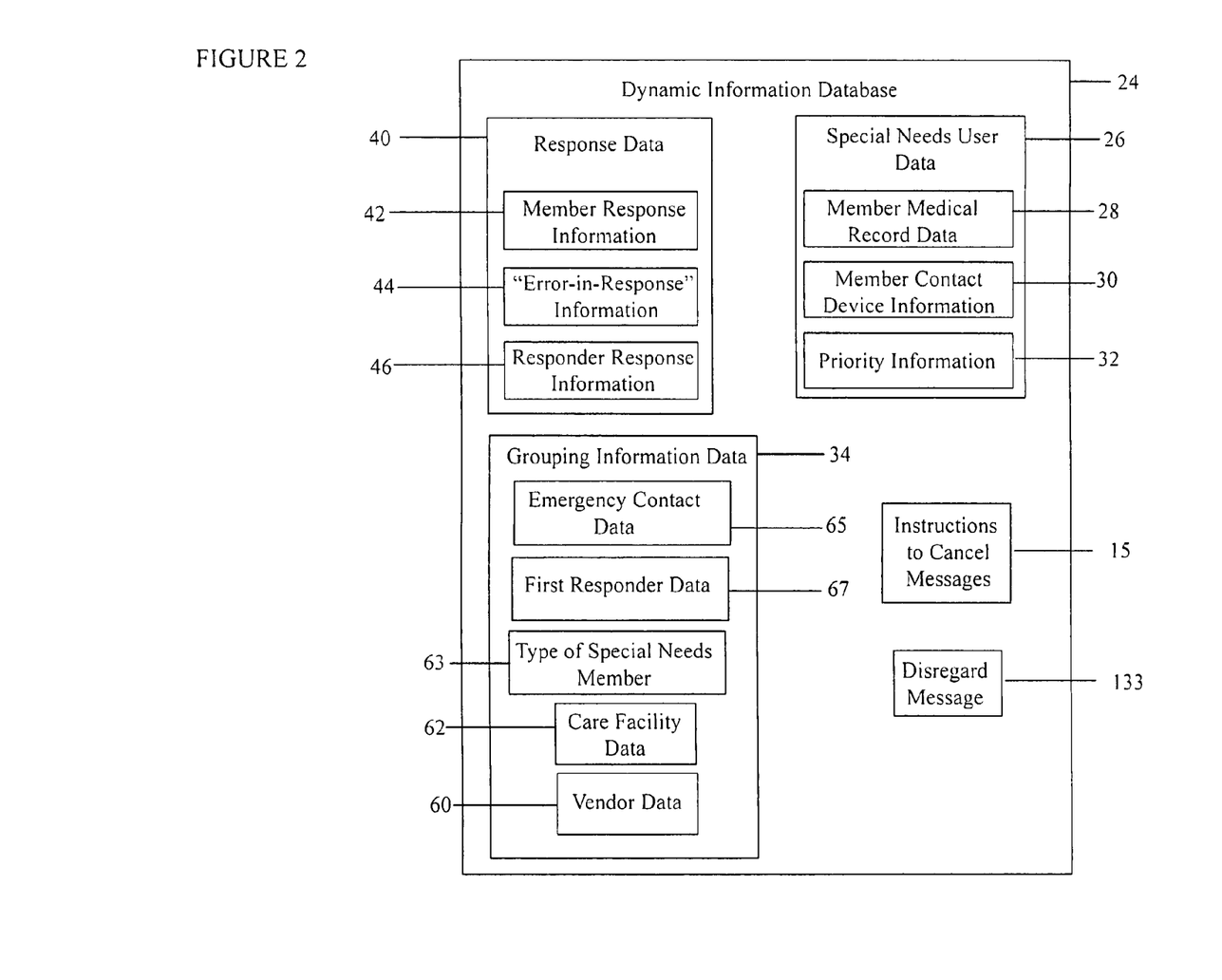
FIG. 2 depicts a representation of an embodiment of a dynamic information database associated with a digital notification and response system.

FIG. 1 further shows the administrator interface 10 initiates distribution of the message 12a and 12b to the special needs network 18 using the grouping information data 34 which is shown in FIG. 2. The administrator interface also uses the special needs user data 26 shown in FIG. 2.

Returning to FIG. 1, the message 12 can be transmitted through at least two industry standard protocols 48a and 48b simultaneously, and the message is received by special needs network member contact devices 22a and 22b, and by responder contact devices 49a, 49b, 49c and 49d, of responders 36, 38a and 38b.

At least one responder contact device 49a, 49b, 49 and 49d, transmits a response 50a, 50b, 50c and 50d through a industry standard protocol 48a and 48b back to the dynamic information database 24.

Referring to FIG. 1, the administrator interface 10 can initiate a distribution of one or more messages. The system can be initiated automatically. For instance, if an alarm is set off, such as a fire or burglar alarm, the administrator interface 10 can be notified automatically, and can send the message to the appropriate contact devices.

In an alternative embodiment, the system can include a language converter to translate a text message to a second language, as part of the computer instructions 11. The language converter is referred to as a translator 52. For example, the language converter can convert the message from English to a second language, such as Korean, Chinese, Vietnamese, French, English, Spanish, Italian, Norwegian, Swedish, German, Japanese, Russian, or Portuguese. The language converter is beneficial because not all users speak the same language and this breaks down the communication between groups of people due to language. The system allows the user to designate a specific language in which to receive the message. The chosen language is stored in the dynamic information database with the member contact data.

In an alternative embodiment, the system can include a text-to-sound file converter 7 in the computer instruction 11. The text-to-sound file converter 7 can be used to translate a message from a text file to a sound file. The text-to-sound file converter is beneficial because the message remains consistent by use of the same voice, with the same accent, same dynamic and same delivery speed. The text-to-sound file converter enables individuals with disabilities, namely visual impairment, to also receive the consistent message.

An RSS/XML feed 200 can be linked directly to the processor 14a, 14b, or both for transmission to the member contact devices 22a, 22b and responder contact devices 49a-49d. At least one member contact device can receive an RSS/XML feed. The RSS/XML feed can be a news feed, weather feed, traffic feed, time feed or combinations thereof.

The administrator interface 10 can include a feature to reserve a conference room for group communication 98 which can be implemented through the computer instructions in the dynamic information database 24. Conference rooms can include chat sessions, multi-party calls, computer linked visual communication, computer linked audio communication, and computer linked text communications between two or more individual on the system.

An example of an industry standard protocol is a Megaco/H.248 Protocol, a Simple Message Transfer Protocol (SMTP), a Short Message Service Protocol (SMS), a Multimedia Message Service Protocol (MMS), an Enhanced Message Service Protocol (EMS), a Media Gateway Control Protocol (MGCP), a SIP Protocol, a H.323 Protocol, an ISDN Protocol, a PSTN Protocol, or the like, or combinations thereof.

The administrator interface 10 can be a local area network interface, a wide area network interface, a virtual private network interface, a synchronous transfer mode interface, a synchronous optical network interface, a call center, a voice mail, or an other similar means to transmit a message to numerous contacts.

The message can be a text message, a numerical message, one or more images, or a combination thereof. The message can be encoded. The message can include a designation that identifies the importance of the message. Examples of these designations include low priority, general priority, significant priority, high priority, and severe priority. The designations can coincide with the U.S Department of Homeland Security's five-color system. For example, the designations can be color-coded; such as green for a low priority message; blue for a preparedness message or general priority message; yellow for a cautionary message such as a significant priority; orange for an emergency message or high priority message; or red for a critical message with a severe priority. These priority levels can be customized to levels of emergencies, such as the use of red for a category 5 hurricane for example.

The message or messages can be stored on the dynamic information database 24. The message can be a prewritten message stored in the database for subsequent use by the administrator or can be generated from the dynamic information database 24 based upon inputs from the administrator and transmitted using the administrator interface.

FIG. 2 shows a schematic of the dynamic information database 24. The dynamic information database 24 can be an SQL™ database, MySQL™ database or other industry standard databases, an Oracle™ database, or other similar databases that can organize information in a similar manner.

The dynamic information database 24 includes special needs user data 26. The special needs user data 26 can include member medical record data 28, member user contact device information 30, and priority information 32 that indicates a contact order for the at least one member contact device.

The special needs user, within the scope of this application, is a person that can receive a message, send a message, respond to a message, or combinations thereof. Examples of a special needs user can be a person in a wheelchair; a person that needs a dialysis machine; a person that needs an oxygen tank; persons with autism; persons who are elderly; persons who have dementia; persons with Down's Syndrome; mentally challenged persons, persons with a mental disorder; and similar people.

The special needs user can be a user as defined by a statute, such as 42 USC §12115, however the invention is not limited to being used by individuals defined in that code section, and can be expanded to include other users as defined by State Code or by another authority or licensee of the technology.

The special needs user's medical record data 28 can include primary care physician name, phone, fax, and related contact data, necessary prescriptions and medicines, types of disabilities that the user has, functional limitations of a user, allergies of a user, transportation needs of the user, primary contact information, such as a family member or guardian contact data, types of treatments.

The special needs user's member contact device information 30 can include an e-mail address, an internet protocol (IP) address, a phone number, and combinations thereof. The information can further include the user's name, the user's address, the user's phone number, the user's device address, the user's social security number, an account code, and combinations thereof. Each member contact device can include information that is unique to each individual user contact device or can include information that is common to all member contact devices. For example, a serial number for a cell phone, a Mac address for an Ethernet card, and other telecommunication devices.

The special needs user data further includes priority information 32. The priority information 32 indicates a contact order for various member contact devices of the special needs network. The contact order is used to direct the order in which the dynamic information database transmits a message to the member contact devices.

The priority information 32 can contain a priority order that directs the administrator interface to contact a first group of user contact devices indicated as a first contact. After all of the user contact devices in the first contact have received the message, the priority order can direct the administrator interface to contact a second group of user contact devices indicated as a second contact. Then, the administrator interface continues to contact user contact devices based on the priority order indicated by the users of the system until all user contact devices are reached and a response is provided from the member contact devices to the dynamic information database (DID).

Returning to FIG. 1, the dynamic information database can have computer instructions II for notifying the administrator 16 when all messages 12*a* and 12*b* have been delivered to the user contact devices 22*a*, 22*b*, 49*a*, 49*b*, 49*c*, and 49*d*.

Also noted in FIG. 1, the administrator interface can also include a "call me" feature 13. The "call me" feature enables an administrator to compose a message to send out to members of the special needs network. The message can be in at least one designated language as indicated by the user.

The dynamic information database shown in FIG. 2 can further include grouping information data 34 in order to group users together into separable and identifiable groups for ease of contact by the administrator interface. The grouping information data 34 can include one or more groups associated with the user contact data such as vendor data 60, such as a bottled oxygen provider; a care facility data 62, such as nursing home bed availability; the type of special needs member 63, such as a handicapped person in a wheelchair; a person that can not walk without a cane, or a person requiring a device to survive such as a bottle of oxygen; an emergency contact data 65, a first responder data 67, or similar groupings.

In additional embodiments, as shown in FIG. 2, the dynamic information database can further include response data 40. The response data can be transmitted from the contact devices back through the at least two standard industry protocols, 48*a* and 48*b*, as shown in FIG. 1, simultaneously through the interface to the dynamic information database. This response data can indicate if the message was received by a responder contact device or a special needs member contact device. The response data can include member response information 42 that indicates the special needs member has received the message 12*a* or 12*b*. The response data can also include responder response information 46 that can indicate whether responder for special needs members has received the message.

The message can be transmitted as an audio file, such as an MP3 file, MP4 file, WAV file, AIFF file, AVI file, ACC file, or combinations thereof. The message can be transmitted as a video file, such as an H.264 MPEG-4. Examples of these types of files are H.264/AVC.

The response data 40 can include "Error-in-Response" information 44 that indicates the user contact data was insufficient and can not be delivered properly to a user contact device or a responder contact device. The "Error-in-Response" information 44 can also indicate that an e-mail address or phone number is invalid. This Error-in-Response information 44 can be noted in the report as and invalid number, and can be indicated typically as a tone message or another electronic signal indicating no response.

The dynamic information database 24 stores the responses and the unique address of each contact device. The response from the member contact device and responder contact device can be an audio file or a dual-tone multi-frequency "DTMF" tone, also known as a touch tone. The "DTMF" tone can be used for telephone signaling over the line in the voice frequency band to the call switching center. The response from the user or member contact device can also be a text telephone such as "TTY" communication such as a teletype communication or a time division duplex, a "TDD" communication.

In an embodiment, the administrator interface 10 can be a government special needs agency, a person responsible for special needs coordination, a computer associated with a special needs database, another digital notification and response system, an analog emergency notification system, and combinations thereof.

The special needs network can also include (a) a vendor for special needs user, such as an ambulance service; (b) a care facility equipped to handle special needs users, such as a mental hospital; (c) a special needs user, such as a blind person; (d) an emergency contact for at least one of the special needs users, such as a neighbor's phone number; (e) a first responder for the special needs user, such as a neighbor's contact number; (f) and combinations thereof.

Figure 3:
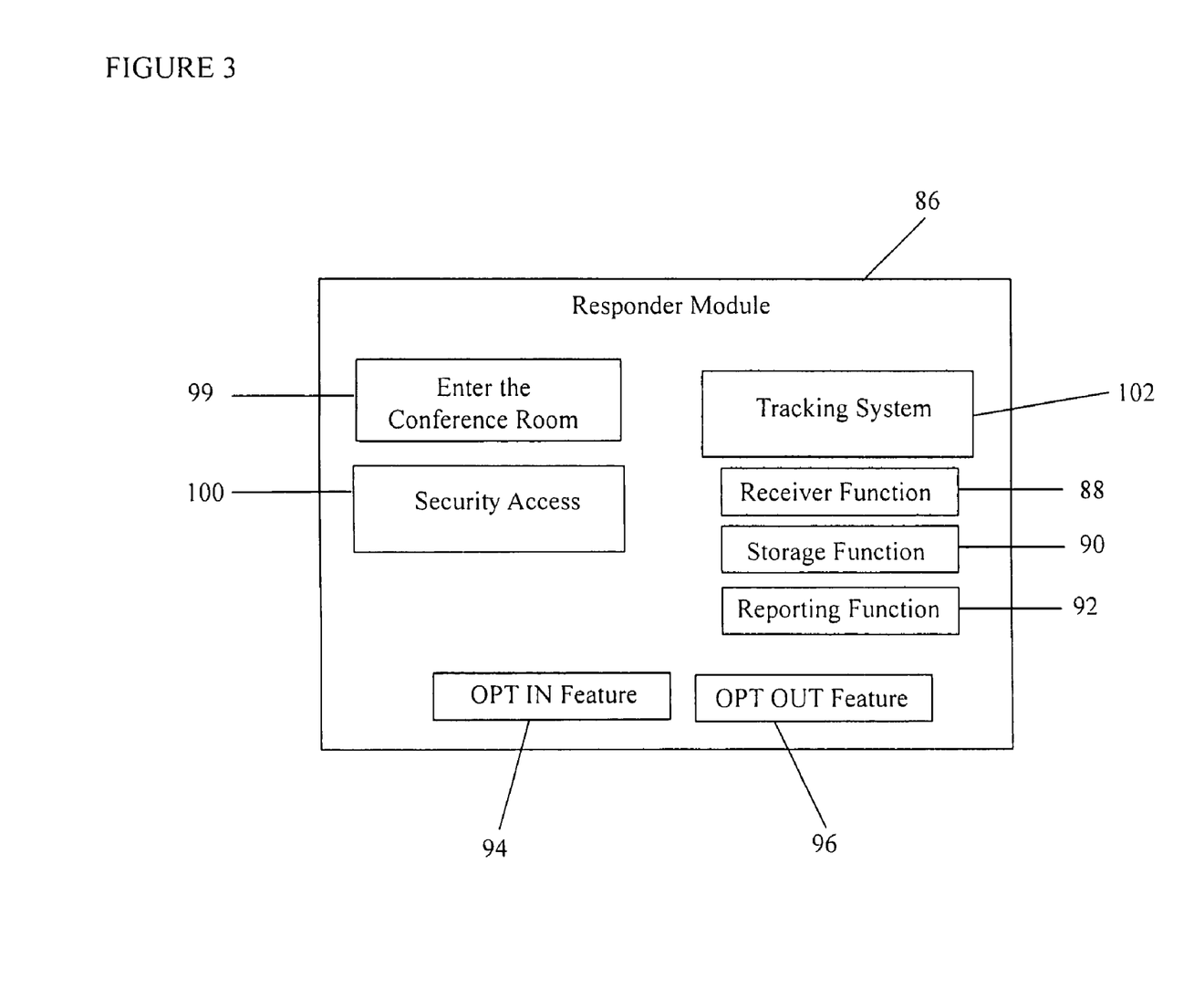
FIG. 3 depicts a representation of an embodiment of a responder module associated with a digital notification and response system.

The administrator interface can include a responder module 86, which is shown in FIG. 3.

The responder module 86 has computer instructions that enable a user, such as a responder or other user, to enter a conference room 99 if the conference room has been reserved by the administrator interface.

In an embodiment, the responder module 86 can also have computer instructions that enable a receiver function 88 for receiving responses from the user which replies to the message, and/or a storage function 90 for recording received responses in audio files, a dual-tone multi-frequency "DTMF", and/or an interactive voice response "IVR" format in the dynamic information database 24.

In an embodiment, the responder module 86 can have a reporting function 92 for providing the status of the responses to the administrator, to a responder, or to a special needs user if any one of those parties has access to the system through various known security access features 100

In another embodiment, the responder module can have an opt-in feature 94, and an opt-out feature 96, or combinations of these feature for members, responders, or groups of member, groups of responders, or combinations thereof, to indicate continued participation in the system.

The responder module can include an enter the conference room feature 99 enabling special needs users and responders to enter the reserved conference room for group communication. A member or responder of the special needs network can enter the conference room via phone or computer link via the Internet™.

Additionally, the responder module can have a security access feature 100 to control access to the administrator interface. The security access can be a bar code reader, a radio frequency identification device "RFID" tag reader, a scannable badge reader, a security token, a smart card reader, a biometric reader, a magnetic card reader, and combinations thereof.

In yet another embodiment, the responder module can include a tracking system 102 for obtaining confirmation that equipment or supplies are delivered to specific care facilities of the special needs network. The tracking system can also be used for tracking placement of special needs users of the special needs network in care facilities of the special needs network.

The responder module can have an RSS/XML feed from a reliable source to update users or groups of users.

In an alternative embodiment, the system can include computer instructions for containing and compiling reporting information in order to generate reports based upon information in the dynamic information database 24.

Figure 4:
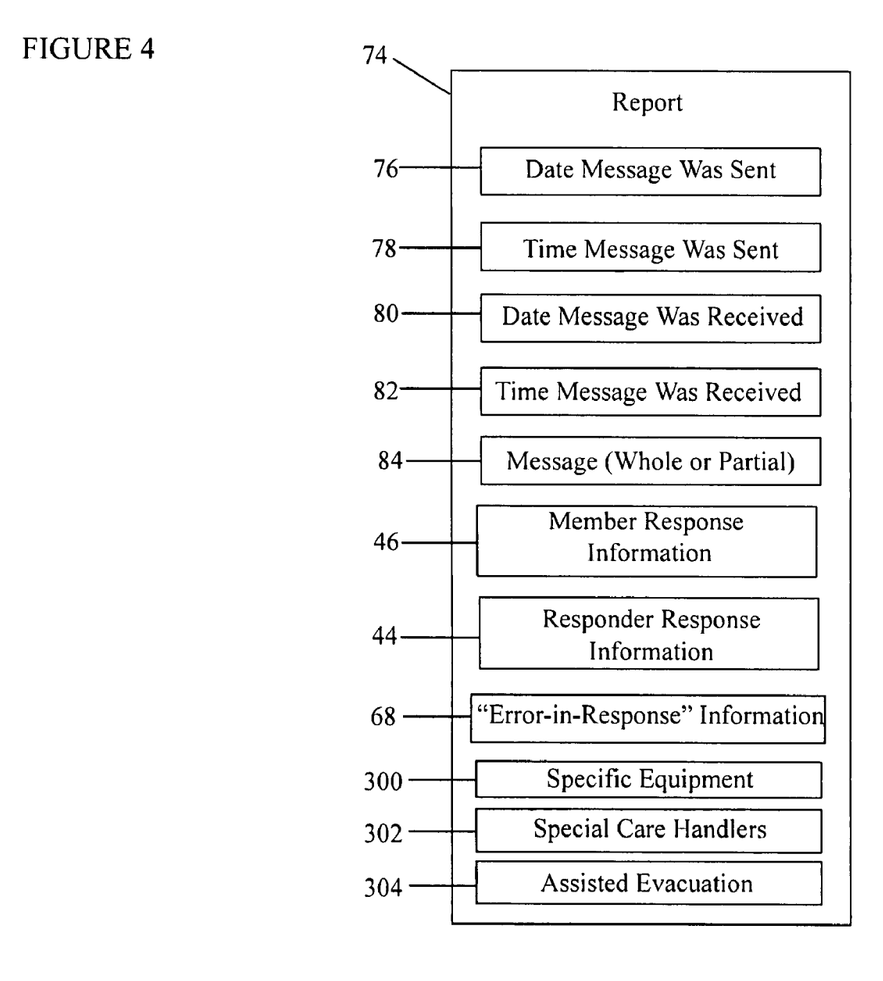
FIG. 4 depicts a representation of an embodiment of a report associated with a digital notification and response system.

A report 74 which can be generated from the reporting information is shown in FIG. 4. The reports can be generated by the administrator, a special needs member or user, a responder, a group of members or responders, or combinations thereof.

The reports 74 can include a date the message was sent 76, such as "May 11, 2006; a time the message was sent 78, such as 4:10 pm; a date the message was received 80, such as May 11, 2006; a time the message was received 82, such as 4:20 pm, content of the message 84, such as "evacuate now tsunami wave will be ashore in 15 minutes," whether whole or partial; member response information 64, which can include "I received the message from the administrator and need assistance in evacuating" sent by a special needs user/member; responder response information 46, such as "our shelter can not accommodate people who need dialysis," and can also include an "error-in-response" information 44, such as a tone or other communication that indicates the message did not reach the intended device.

The "Error-in-Response" information indicates which contact devices are working properly, or if the member, responders, groups, or combinations thereof, must be contacted for additional information or working numbers.

The tone provided for "Error-in-Response" information is typically generated by and special information tone, or a "SIT" tone.

The administrator can create custom designed reports, or standard reports can be generated from the dynamic information database for use by the administrator.

The report 74 can also have information on specific equipment 300 needs of the special needs users or responders, such as whether a person needs an oxygen tank.

In yet another embodiment, the report 74 can contain information on special care handlers 302, such as a specialty doctor, such as an oncologist, to treat the special needs person.

Still another embodiment contemplates that the report 74 may include information on assisted evacuations 304 which indicates that a special needs person or user would require assistance of an EMS or neighbor, or other designated service, to be evacuated.

FIG. 2 shows the dynamic information database can contain computer instructions enabling administrators to cancel messages in progress 15.

In yet another embodiment, the dynamic information database can contain computer instructions for administrators to cancel messages scheduled for delivery at a future date and time.

Additionally, the dynamic information data base further can include computer instructions enabling administrators to transmit a "disregard message" notification 133 for users that received the message while administrators can cancel messages in progress.

Figure 5:
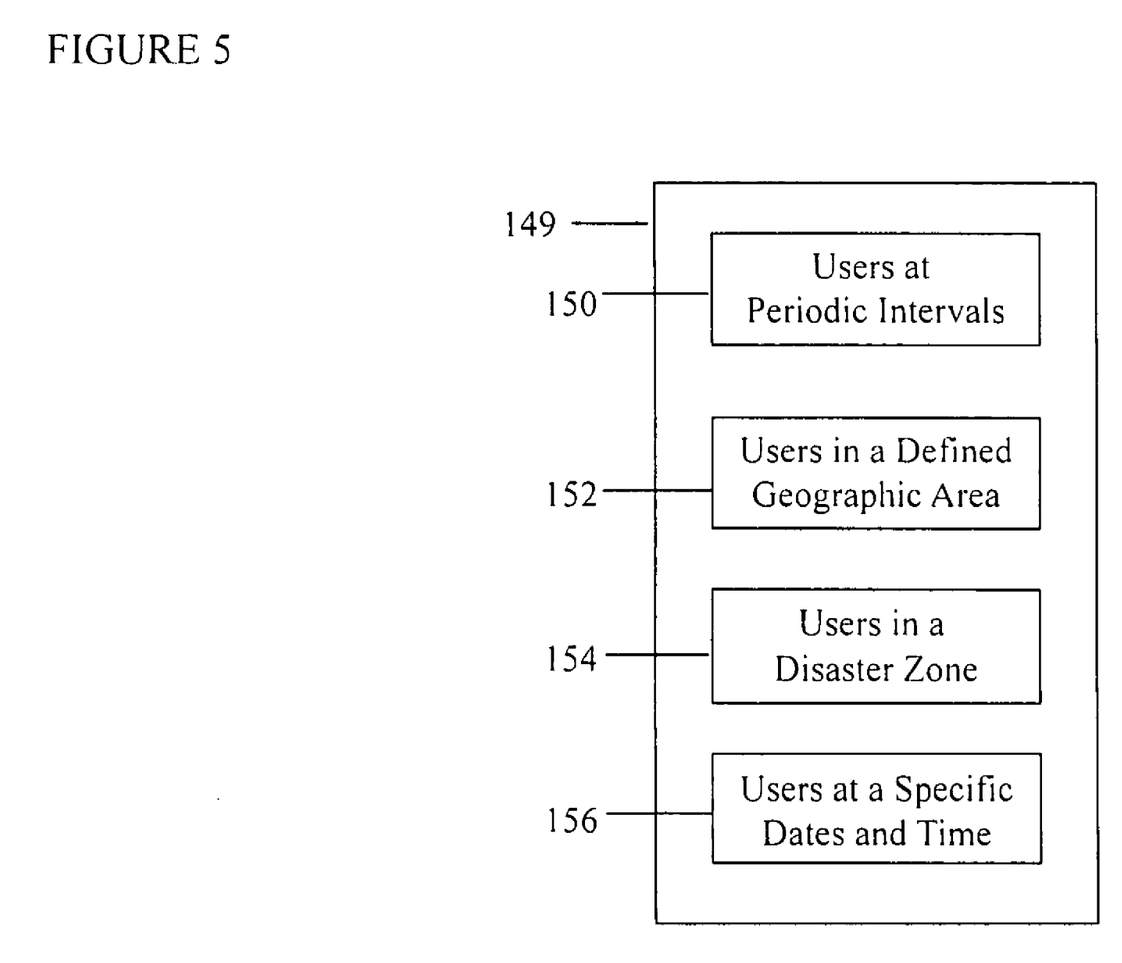
FIG. 5 depicts a representation of computer instructions for use by an administrator to broadcast messages at intervals or to certain geographic areas.

FIG. 5 shows computer instructions 149 which enables a message to be broadcast to users of the system in certain ways. Computer instructions 149 can include computer instructions to broadcast the message to users at a periodic interval 150, such as every 5 minutes, computer instructions to broadcast the message to users in a defined geographic area 152, such as Texas, computer instruction to broadcast the message to users in a disaster zone 154, such as the Brazos river flood plain in Texas, computer instructions to broadcast the message to users at specific dates and times 156 such as March 14 at 9 am.

The message can be an audio file, video files, image file, or text file. The message can be a compressed audio or video file. It is contemplated that the message can be read by a flash reader, Adobe™ reader, or an Acrobat™ reader. The message is transmittable by email, fax, satellite, phone, internet, or combinations thereof.

An embodiment of the invention contemplates that the message can be linked to a map database such as a Google Earth map system, or a NOAA map database.

In yet another embodiment, a map can be transmitted with the message, such as an image file of a map. Specific directions can be included with the map, that includes directions, such as "turn left in 0.5 miles on Ryan Street, turn right in 0.8 miles onto David Street," and so on until the respondent or user reaches the intended goal, such as an evacuation center.

In still another embodiment, GPS coordinates of an evacuation facility, or responder's location, user can be embedded in the message or response enabling ease of locating the desired target, user, facility, or responder.

In another embodiment, a response from a special needs user of the special needs network can be an audio file, a TTY communication, TTD communication, or a dual-tone-multi-frequency "DTMF" tone.

In another embodiment, the system can include a reporting system using responses to the message for messaging reports to groups of users of the special needs network. The reports can indicate a need for: (i) specific equipment, (ii) special care handlers, (iii) assisted evacuations, or (iv) combinations thereof.

The reporting system can have computer instructions to request a second response from members of the special needs network if a member can not accommodate requirements of the special needs users identified in the report.

The reporting system can have instructions to provide an additional message to vendors of the special needs network to deliver materials to at least one care facility.

An embodiment of the invention contemplates that individual maps can be generated, in addition to a master evacuation map, showing interactive or individual evacuation routes. Different maps enable administrators and other users to print out individual evacuation plans.

The embodiments have been described in detail with particular reference to certain preferred embodiments, thereof, but it will be understood that variations and modifications can be effected within the scope of the embodiments, especially to those skilled in the art.

What is claimed is:

1. A digital notification and response system, comprising:
   A. an administrator interface for preparing and transmitting a message from an administrator to a special needs network using at least one processor, wherein each member of the special needs network has at least one member contact device;
   B. a dynamic information database for use in preparing the message, comprising:
      i. special needs user data comprising:
         a. member medical record data;
         b. member contact device information; and
         c. priority information;
      ii. grouping information comprising: a type of special needs member;
      iii. response data comprising:
         a. member response information that indicates the at least one member contact device has received the message,
         b. "error in response" information that indicates insufficient contact device information existed to contact the at least one member contact device;
   wherein the administrator initiates distribution of the message to the special needs network using the grouping information and the special needs user data, and the message is transmitted through at least two industry standard protocols simultaneously to the special needs network, and the message is received by the at least one member contact device and at least one responder with at least one responder contact device, and the at least one member contact device and at least one responder contact device transmits a response through the at least two industry standard protocols to the dynamic information database.

2. The system of claim 1, wherein the administrator is a member of the group consisting of: a government special needs agency, a person responsible for special needs coordination, a computer associated with a special needs database, an other digital notification and response system, an analog emergency notification system, and combinations thereof.

3. The system of claim 1, wherein the dynamic information database further comprises: (a) vendor data; (b) care facility data; (c) emergency contact data; and (d) first responder data.

4. The system of claim 1, wherein the special needs network is comprised of a member of the group consisting of: (a) a vendor for special needs member, (b) a care facility equipped to handle special needs member, (c) a special needs member, (d) an emergency contact for special needs member, (e) a first responder for special needs member, (f) and combinations thereof.

5. The system of claim 1, wherein the at least two industry standard protocols are selected from the group consisting of a Megaco/H.248 protocol, simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol and combinations thereof.

6. The system of claim 1, wherein the dynamic information database further comprises: computer instructions enabling administrators to cancel messages in progress and for administrators to cancel messages scheduled for delivery at a future date and time.

7. The system of claim 1, further comprising computer instructions for notifying the administrator when all messages have been delivered to the contact devices.

8. The system of claim 1, further comprising computer instructions for broadcasting the message: to users at periodic intervals, to users in a defined geographic area, to users in a designated disaster zone, or to users at specific dates and times.

9. The system of claim 1, wherein the message enables at least one member of the special needs network to reserve the conference room.

10. The system of claim 1, wherein the administrator interface controls security access to the administrator interface using a member selected from the group: a barcode reader, a radio frequency identification device "RFID" reader, a scannable badge reader, a security token, a biometric reader, a magnetic card reader, a smart card reader, or combinations thereof.

11. The system of claim 1, wherein the administrator interface comprises a "call me" feature enabling an administrator to compose a message to send out to members and responders of the special needs network for alerting the designated user or groups of users using the message.

12. The system of claim 1, wherein the message is an audio file, an image file, a video file, a text file, or a combination thereof.

13. The system of claim 1, wherein the administrator interface further comprises a responder module comprising: a receiver function for receiving responses from the user which replies to the message.

14. The system of claim 1, wherein the at least one member contact device further receives an RSS/XML feed.

15. The system of claim 1, further comprising a responder module for members, responders, or groups of to indicate continued participation comprising an opt-in feature, an opt-out feature, or combinations thereof.

16. The system of claim 1, wherein the response from a special needs user of the special needs network is an audio file, a TTY communication, TTD communication, or a dual-tone-multi-frequency "DTMF" tone.

17. The system of claim 1, further comprising a reporting system using responses to the message for messaging reports to groups in the special needs network, wherein the reports indicate a need for: (i) specific equipment, (ii) special care handlers, (iii) assisted evacuations, or (iv) combinations thereof.

18. The system of claim 17, wherein the reporting system comprises computer instructions to request a second response from members of the special needs network if a member can not accommodate requirements of special needs users identified in the report.

19. The system of claim 18, wherein the reporting system comprises computer instructions to provide an additional message to vendors of the special needs network to deliver materials to at least one care facility.

20. The system of claim 1, wherein the response data further comprises responder response information that indicates at least one responder contact device has received the message.

21. The system of claim 1 wherein the administrator interface further comprises a responder module with a storage function for recording received responses in dual-tone multi-frequency "DTMF" or interactive voice response "IVR" format in the dynamic information database.

22. The system of claim 1 wherein the administrator interface further comprises responder module a reporting function for creating reports using the received responses.

23. The system of claim 12, wherein the audio files are transmitted by email, phone, a link on a website, or combinations thereof.

24. The system of claim 12, wherein the audio file comprises an MP3 file, MP4 file, WAV file, AIFF file, AVI file, ACC file, or combinations thereof.

25. The system of claim 12 wherein the video file comprises an H.264 Mpeg.

26. The system of claim 6, wherein dynamic information data base further comprises computer instructions enabling administrators to transmit a "disregard message" notification for users that received the message while administrators cancel messages in progress.

27. The system of claim 1, further comprising a text-to-sound file converter for translating the message from text to a sound file.

* * * * *